(12) United States Patent
Fang et al.

(10) Patent No.: US 7,394,429 B2
(45) Date of Patent: Jul. 1, 2008

(54) COMMUNICATION DEVICE AND RELATED ANTENNA MODULE

(75) Inventors: Chien-Hsing Fang, Taipei Hsien (TW); Ho-Chen Chang, Taipei Hsien (TW)

(73) Assignee: Wistron NeWeb Corporation, Hsi-Chih, Taipei Hsien (TW)

( * ) Notice: Subject to any disclaimer, the term of this patent is extended or adjusted under 35 U.S.C. 154(b) by 206 days.

(21) Appl. No.: 10/905,191

(22) Filed: Dec. 21, 2004

(65) Prior Publication Data

US 2005/0159196 A1 Jul. 21, 2005

(30) Foreign Application Priority Data

Jan. 16, 2004 (TW) .............................. 93101235 A

(51) Int. Cl.
*H01Q 1/50* (2006.01)
*H01Q 21/24* (2006.01)
*H01Q 21/28* (2006.01)

(52) U.S. Cl. ..................... 343/702; 343/841; 343/853
(58) Field of Classification Search ................. 343/702, 343/841, 853, 756, 799, 834–838
See application file for complete search history.

(56) References Cited

U.S. PATENT DOCUMENTS

| 2,272,312 | A | * | 2/1942 | Tunick | ............... | 455/24 |
| 6,914,577 | B2 | * | 7/2005 | McCandless | ............... | 343/841 |

FOREIGN PATENT DOCUMENTS

| EP | 1 237 225 A1 | 9/2002 |
| JP | 11-205034 | 7/1999 |
| JP | 2003-110355 | 4/2003 |

* cited by examiner

*Primary Examiner*—Michael C Wimer
(74) *Attorney, Agent, or Firm*—Winston Hsu

(57) ABSTRACT

A wireless communication device includes a shell having a first shielding surface for shielding electromagnetic waves, a data processing module, a wireless communication module connected to the data processing module, and an antenna module disposed on the shell and connected to the wireless communication module. The antenna module has a first antenna unit and a second antenna unit. The first shielding surface shields the first antenna unit from the second antenna unit.

10 Claims, 11 Drawing Sheets

COMMUNICATION DEVICE AND RELATED ANTENNA MODULE

BACKGROUND OF INVENTION

1. Field of the Invention

The present invention relates to a communication device and its antenna module, and more specifically, to an antenna module having a ring structure.

2. Description of the Prior Art

In modern society, data is required to be accessible anytime and anywhere. As such, wireless communication devices are the best choice. As technology progresses, portable wireless communication devices such as mobile phones and personal digital assistants (PDA) play an important role in modern life.

In each wireless communication device, the antenna used for receiving and transmitting radio waves is an important component. Especially in a portable wireless communication device, an antenna is not only required to be compact in size, but also required to have a larger bandwidth as the integration of radio data signals (bits per unit time) increases.

As wireless communication technology progresses, access points (AP) are widely used. Computers in a wireless local area network (LAN) needs wireless LAN cards to transmit radio signals, and APs receive the radio signals from each station and bridge the LAN to an Ethernet™ in order to share the resources on the net. In order to expand a wireless network, it is required that a plurality of APs be disposed, or the positions of APs are well arranged in cooperation with a two-layered Ethernet™ exchanger and CAT-5 cables.

Please refer to FIG. 1 showing a network topology using an AP 50. The AP 50 includes an antenna unit 52 for receiving and transmitting radio signals. The operational range of the AP 50 is shown by a broken circle in FIG. 1. When there are three stations accessing the network via the AP 50, the data transmission speed of the AP 50 is shared between these three stations. That is, if the maximum transmission speed of the AP 50 is 11 Mbps, ideally the bandwidth available to each station is only 11/3 Mbps, in other words, the three stations share a bandwidth of 11 Mbps.

In order to improve the data transmission speed or expand the operational range, it is possible to dispose a plurality of APs 50. Please refer to FIG. 2 showing a network topology using three APs 50. By turning on three APs 50, the transmission speed is ideally increased to three times the transmission speed provided by one AP 50. That is, if the maximum transmission speed of the AP 50 is 11 Mbps, ideally three APs 50 provides a bandwidth of 11*3=33 Mbps. Thus, if there are three stations in the network, ideally the bandwidth available to each station is 33/3=11 Mbps. Therefore, the transmission speed can be improved by increasing the number of the APs 50. However, when increasing the number of the APs 50, if different APs 50 use the same or neighboring channels, the main lobe of a channel will overlap with the main lobe or the side lobe of another channel so that interference may occur. Thus in FIG. 2, according to the 802.11b standard, the three APs 50 use channel 1, channel 6 and channel 11, respectively so that the interference due to the overlap of the main lobes is minimized. Please refer to FIG. 3 showing the distribution of channels according to the IEEE 802.11b standard. In the band between 2.400 GHz and 2.484 GHz, the peak of the main lobe of channel 1 is at 2.412 GHz, the peak of the main lobe of channel 6 is at 2.437 GHz, and the peak of the main lobe of channel 11 is at 2.462 GHz, so that there is a bandwidth of 25 MHz between each two of the three channels. The interference caused by the overlap of the main/side lobes can be reduced if the interval used between each channel is kept over 5. Therefore, if there are too many APs 50, the interference between channels becomes more serious and the APs cannot be too close to each other. Accordingly, the network is unable to provide the stations a better transmission speed. Moreover, since each AP requires a network line to be connected to the LAN, the installation is very complicated.

SUMMARY OF INVENTION

One objective of the present invention is therefore to provide a communication device and an antenna module, in order to solve the problems in the prior art.

The present invention is to provide a wireless communication device includes a shell having a first shielding surface for shielding electromagnetic waves, a data processing module, a wireless communication module connected to the data processing module, and an antenna module disposed on the shell and connected to the wireless communication module, the antenna module having a first antenna unit and a second antenna unit. Wherein the first shielding surface disposes between the first antenna unit and the second antenna unit.

The present invention further provides a wireless communication device including a shell, a data processing module, a wireless communication module connected to the data processing module having a first communication unit and a second communication unit, and an antenna module disposed on the shell and connected to the wireless communication module, the antenna module having a first antenna unit and a second antenna unit. The first antenna unit is connected to the first communication unit for emitting a first electromagnetic wave, and the second antenna unit is connected to the second communication unit for emitting a second electromagnetic wave in a polarity direction perpendicular to the first electromagnetic wave.

The present invention further provides an antenna device including a shell having a first shielding surface that shields the penetration of electromagnetic waves, and an antenna module disposed on the shell having a first antenna unit and a second antenna unit. Wherein the first shielding surface disposes between the first antenna unit and the second antenna unit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
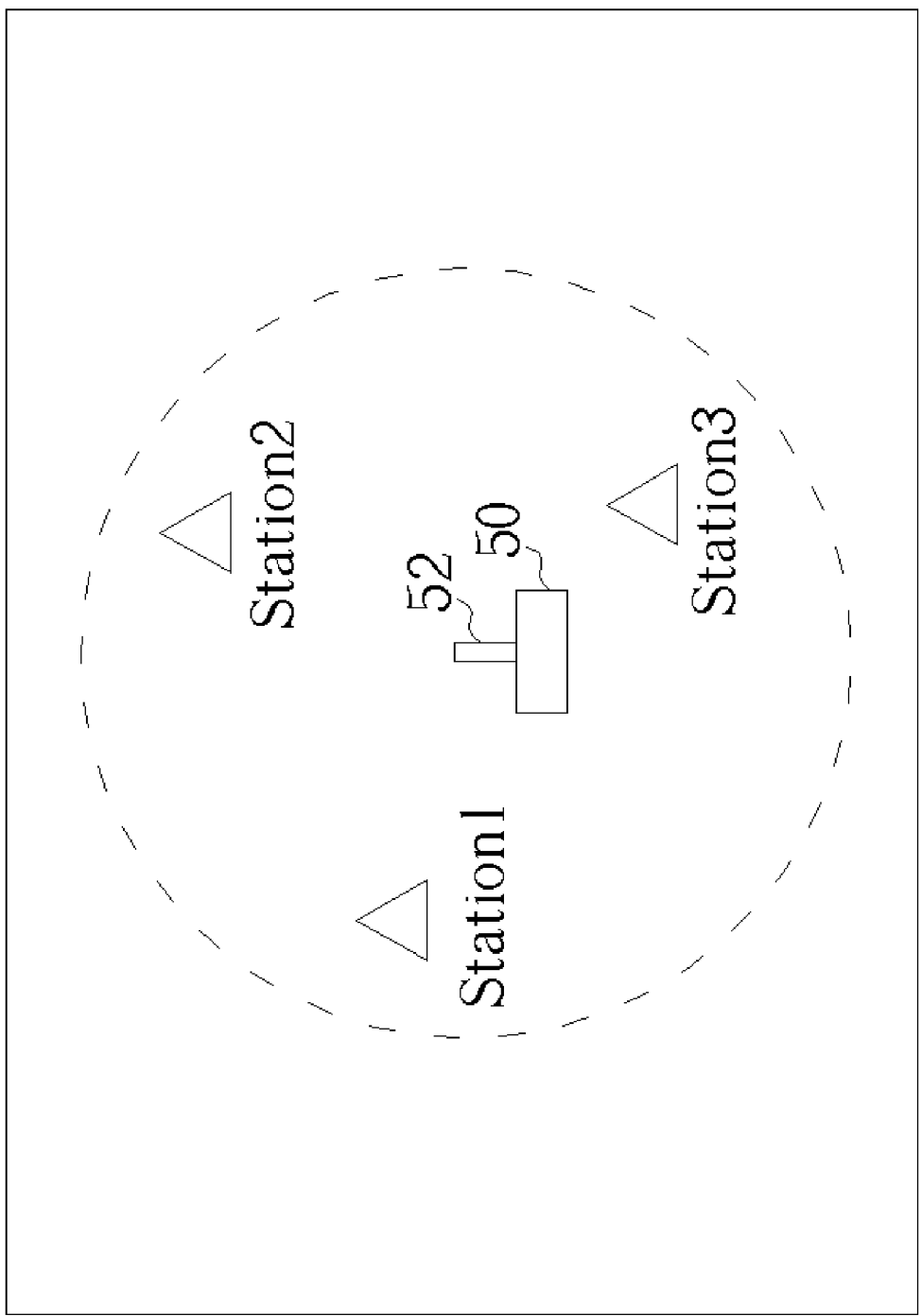
FIG. 1 illustrates a conventional network topology using an AP.
Figure 2:
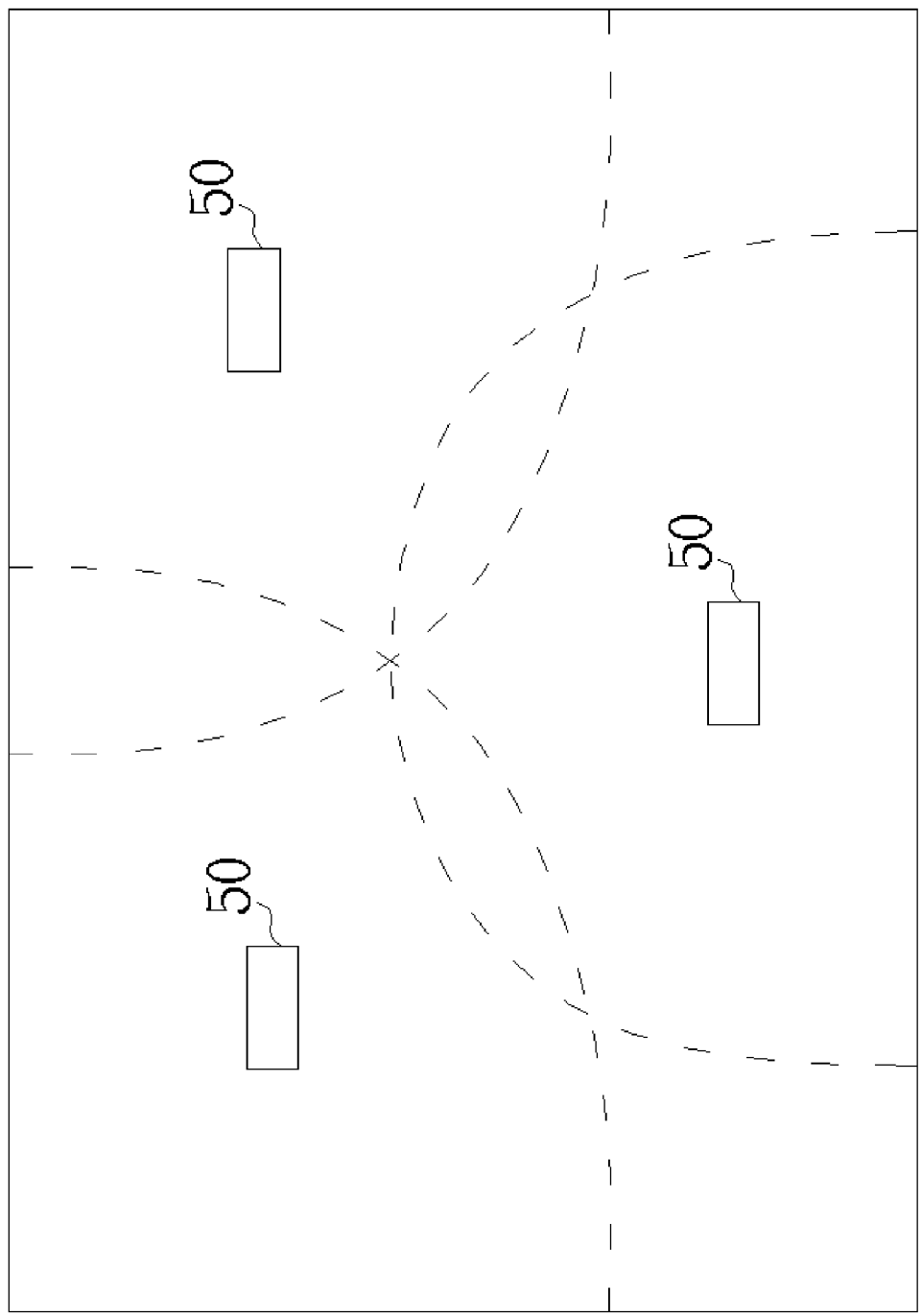
FIG. 2 illustrates a conventional network topology using three APs.
Figure 3:
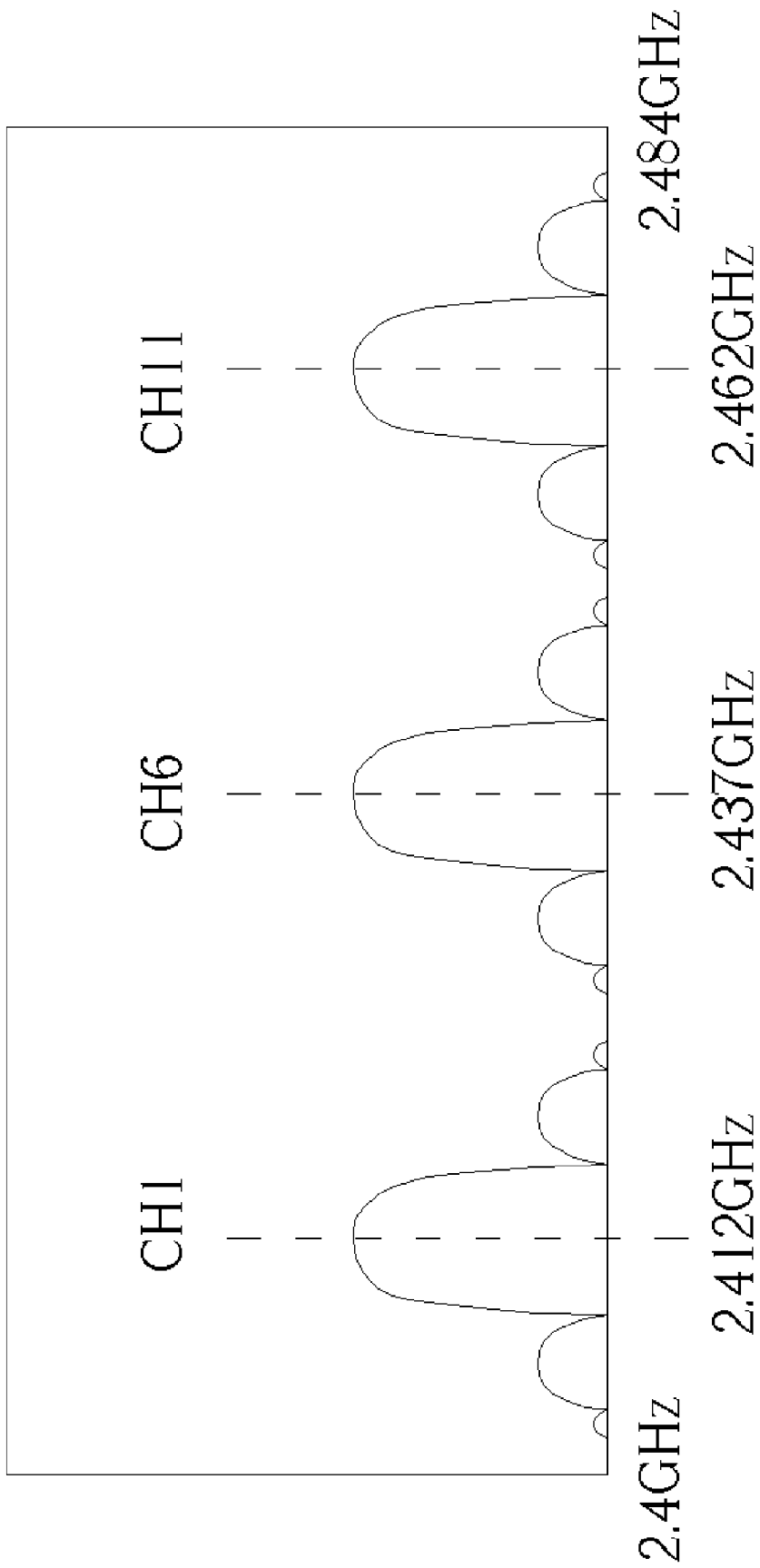
FIG. 3 illustrates the distribution of channels according to the IEEE 802.11 b standard.
Figure 4:
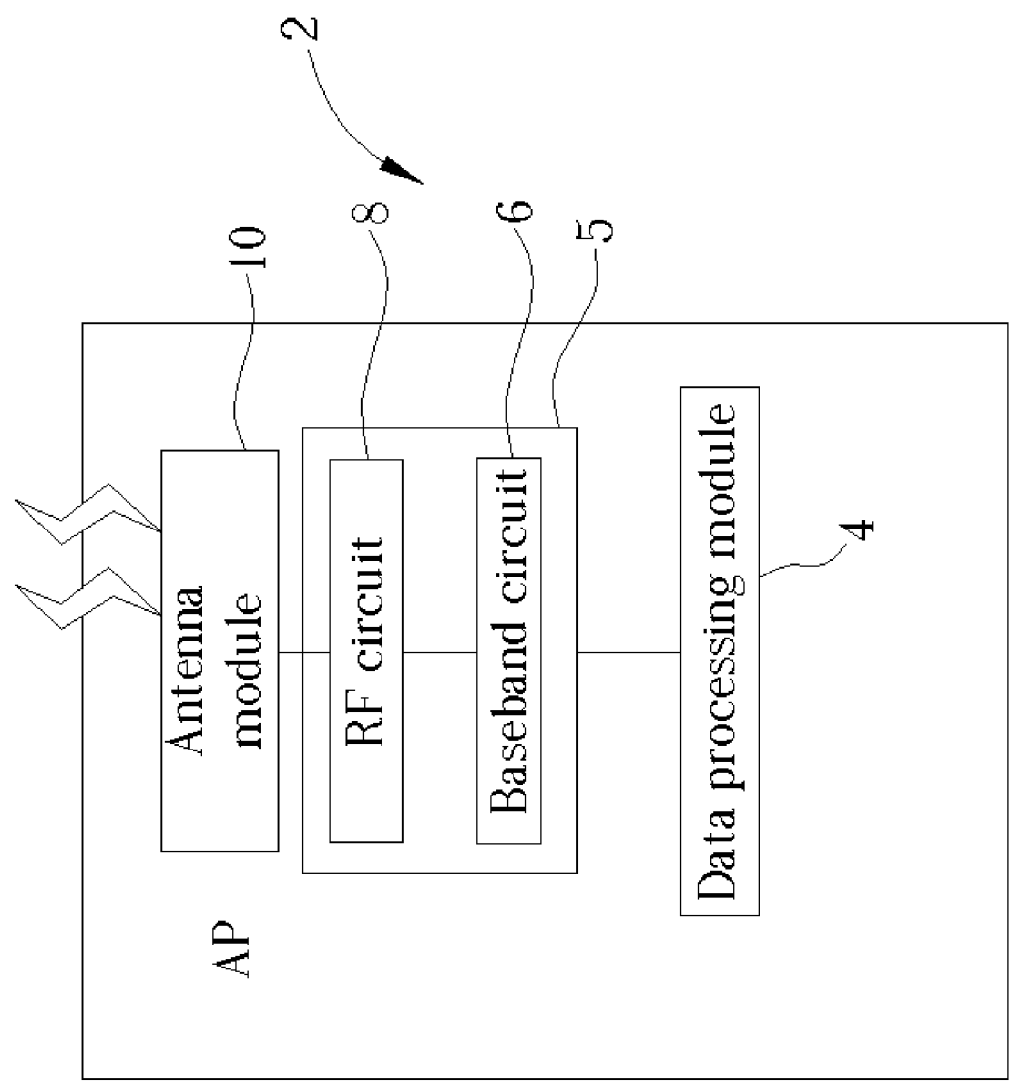
FIG. 4 is a block diagram of an AP according to the present invention.

Please refer to FIG. 4 showing a block diagram of an access point (hereafter known as AP) 2. The AP 2 includes a data processing module 4 for controlling the operation of the AP 2, a wireless communication module 5 having a baseband circuit 6 and a radio frequency (RF) circuit 8, and an antenna module 10. The data processing module 4 transmits communication signals to the baseband circuit 6. The baseband circuit 6 encodes the communication signals into baseband signals, which are then transmitted to the RF circuit 8. The RF circuit 8 modulates the baseband signals and emits them using the antenna module 10. The RF circuit 8 can also receive RF signals using the antenna module 10 and demodulate them into baseband signals for the baseband circuit 6 to decode into communication signals, which are then transmit to the data processing module 4. The radio signals of the antenna module 10 comply with the IEEE 802.11a, IEEE 802.11b, or IEEE 802.11 g standards.

Figure 5:
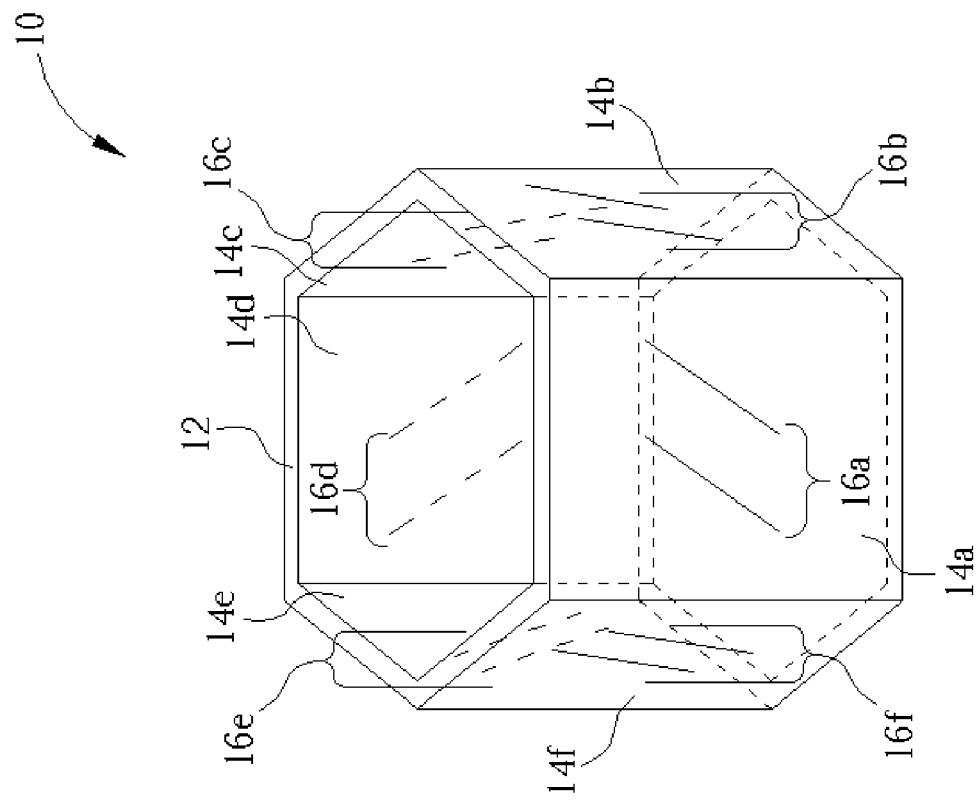
FIG. 5 illustrates an antenna module according to the present invention.
Figure 6:
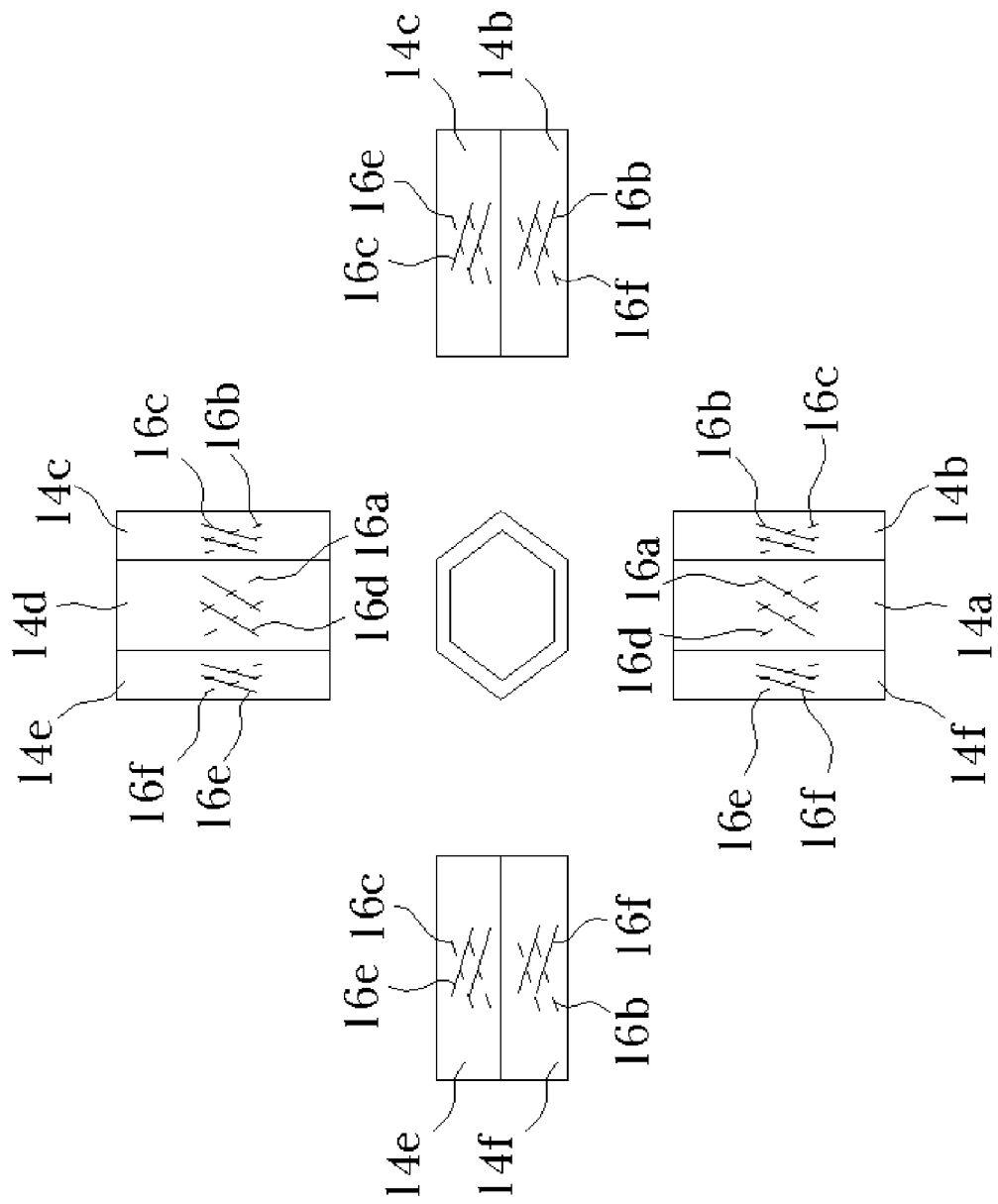
FIG. 6 is a five-view drawing of the antenna module in FIG. 5.

Please refer to FIG. 5 showing an antenna module 10 and to FIG. 6 showing a five-view drawing of the antenna module 10. The antenna module 10 includes a hexagonal shell 12. The shell 12 includes six metal shielding surfaces 14a-14f formed on the six surfaces of the hexagon for shielding radio signals, and six antenna units 16a-16f formed respectively on the six shielding surfaces 14a-14f, arranged in the same direction, and having an angle of 45 degrees with the bases of the six shielding surfaces 14a-14f, respectively. The data processing module 4 and the wireless communication module 5 (not shown in either FIG. 5 or FIG. 6) are disposed inside the shell 12 for processing radio signals received or transmitted. The wireless communication module 5 can be a single independent module controlling the six antenna units 16a-16f, or be composed of six communication units, each controlling one of the antenna units. It is an advantage of the latter implementation that if any communication unit fails, only that single part should be replaced instead of the whole wireless communication module 5.

Figure 7:
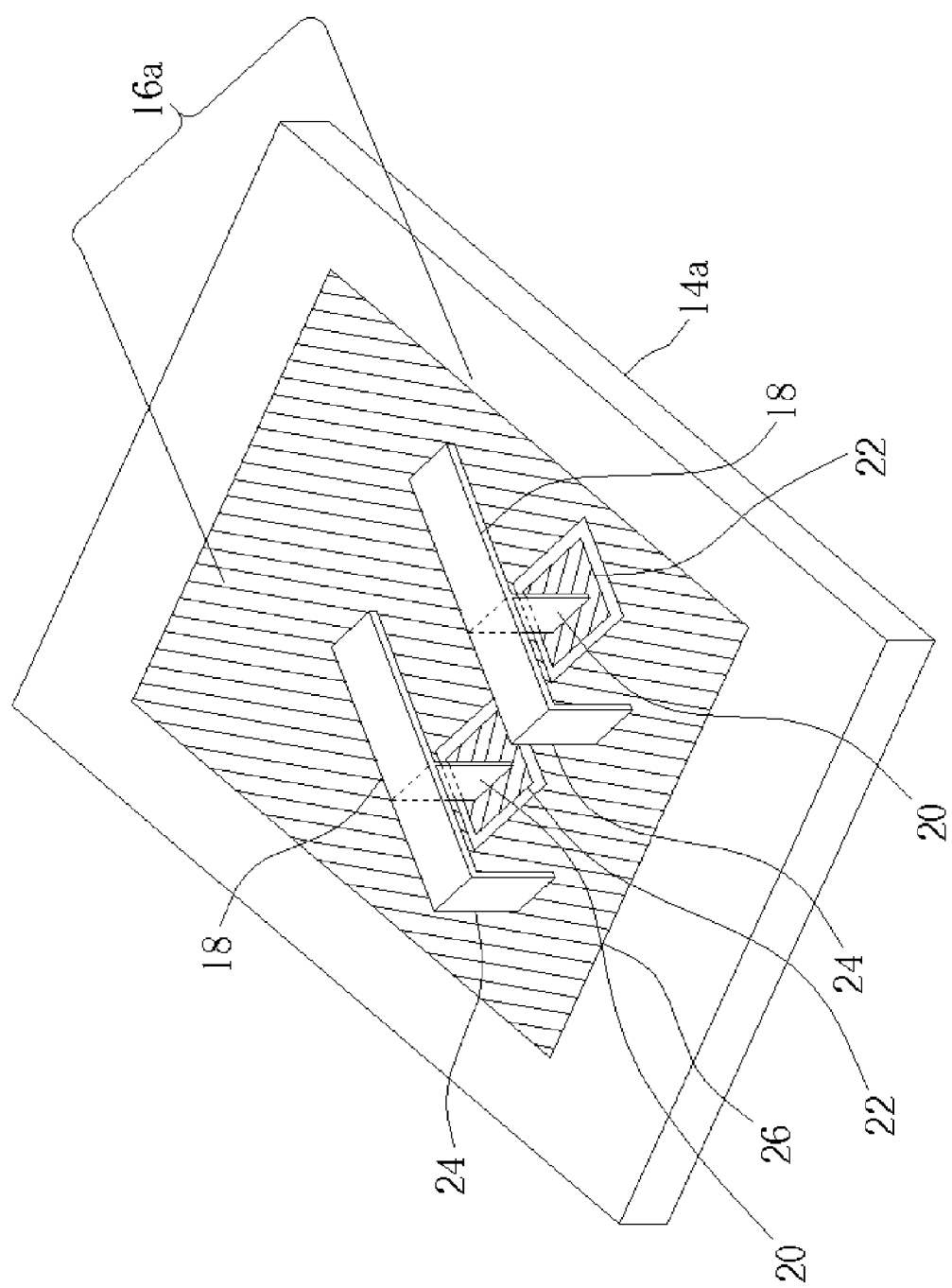
FIG. 7 illustrates the connection between an antenna unit and a shielding surface.

Please refer to FIG. 7 showing the connection between the antenna unit 16a and the shielding surface 14a. The antenna unit 16a can be a planar inverted F antenna (PIFA) or another antenna that is connected to the shielding surface 14a. The antenna unit 16a is composed of two PIFAs including two emitters 18 arranged in a formation for receiving and emitting RF signals. Two feeding ends 20 stretching out from the emitters 18 are connected perpendicularly to two signal transmitting ends 22 of the shielding surface 14a for transmitting RF signals, and two ground ends 24 stretching out from the emitters 18 are connected perpendicularly to a ground plane 26 of the shielding surface 14a. The antenna unit 16a transmits and receives RF signals by using the resonance of the emitters 18. The length of each emitter 18 has an effect on transmitting and receiving signals' frequency range. The transmission of RF signals between the antenna unit 16a and the RF circuit 8 (not shown in FIG. 7) relies on the connection between the feeding end 20 of the antenna unit 16a and the signal transmitting end 22 of the shielding surfaces 14a. The antenna unit 16a is not limited to include two emitters 18. A single emitter or another number of emitters is also possible. The connection between the other five antenna units 16b-16f and the other five shielding surfaces 14b-14f is the same as shown in FIG. 7. The antenna unit 16 can be connected to the shielding surface 14 in other manner and is not limited to the aforementioned description.

Figure 8:
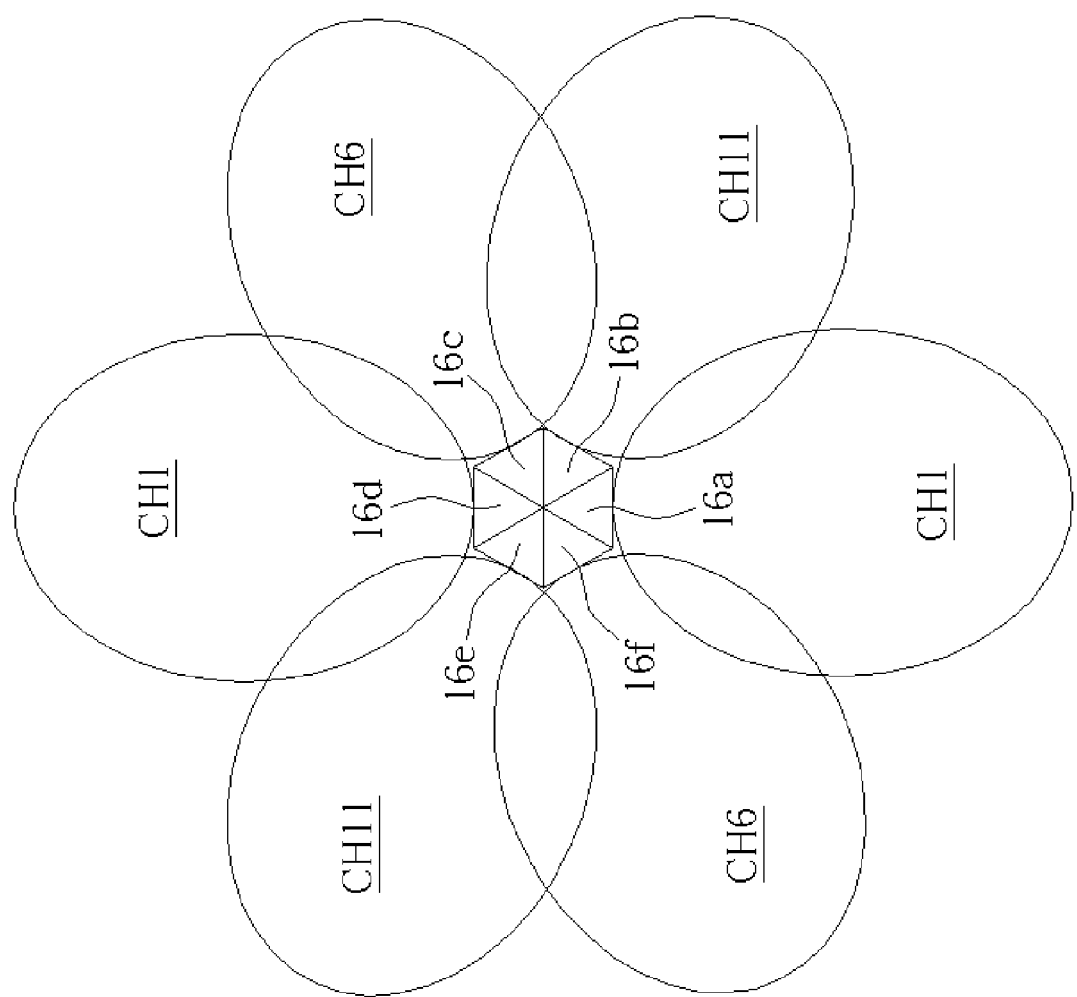
FIG. 8 illustrates the antenna units of an AP sharing channels.

According to the present invention, the antenna units on two parallel shielding surfaces are perpendicular to each other. That is, the antenna unit 16a on the shielding surface 14a is perpendicular to the antenna unit 16d on the shielding surface 14d, the antenna unit 16b on the shielding surface 14b is perpendicular to the antenna unit 16e on the shielding surface 14e, and the antenna unit 16c on the shielding surface 14c is perpendicular to the antenna unit 16f on the shielding surface 14f. In such a manner, the polarity directions of the antenna units on two parallel shielding surfaces are perpendicular to each other so that the signal isolation between the two antenna units is increased. For instance, if the AP 2 is for providing IEEE 802.11b or IEEE 802.11 g LAN service, since three channels, such as CH1, CH6 and CH11 can be used within a band of 2.4 GHz (2.4-2.4835 GHz), the interference caused by the main lobe overlap can be reduced. Please refer to FIG. 8 showing the antenna units of the AP 2 sharing the channels. As shown in FIG. 8, signal channels used by the antenna units on two parallel shielding surfaces are the same. That is, the antenna units 16a and 16d use CH1, the antenna units 16b and 16e use CH11, and the antenna units 16c and 16f use CH6. In such a manner, the antenna units on two neighboring shielding surfaces do not use the same channel or even two channels close in frequency to prevent the interference between each other. And although the antenna units on two parallel surfaces use the same channel, since the direction of emission is opposite to each other and there is a metal shield between the two antenna units, interference does not occur. In addition, indirect interference caused by environmental radio reflection should be considered. Since the antenna units on two parallel shielding surfaces are perpendicular to each other, the radio polarities of the antenna units are accordingly perpendicular to each other. Therefore, even if the same channel is used, radio waves caused by reflection or scattering will be received by an antenna unit on the opposite shielding surface and the interference will be reduced to a minimum. Moreover, the AP 2 uses six antenna units for wireless data transmission, so that the transmission speed is ideally six times that of a single AP. In other words, if the maximum transmission speed of an AP is 11 Mbps, the AP 2 according to the present invention provides a maximum transmission speed of 11*6=66 Mbps.

Figure 9:
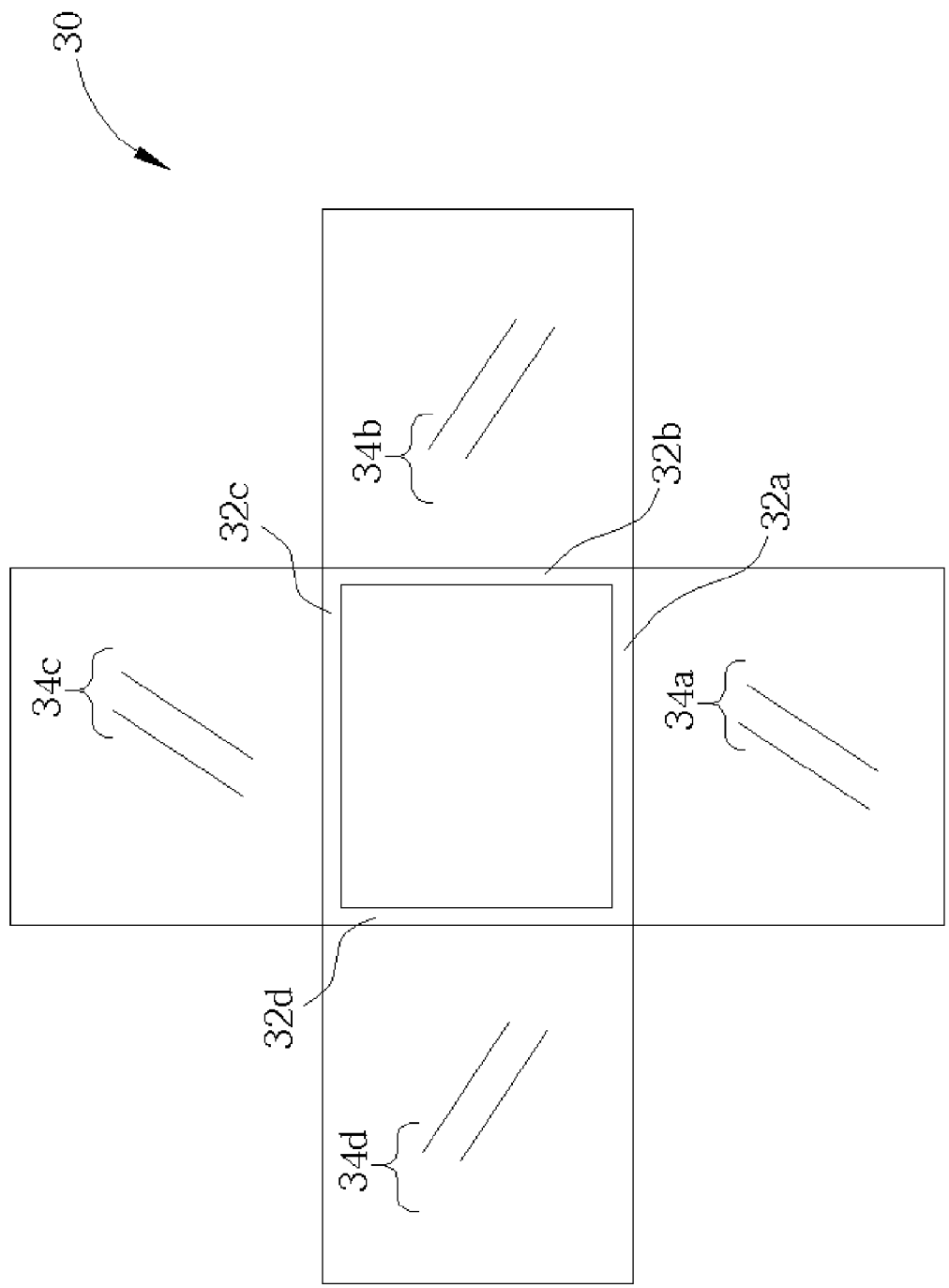
FIG. 9 illustrates an antenna module having a plurality of antenna units according to a second embodiment of the present invention.
Figure 10:
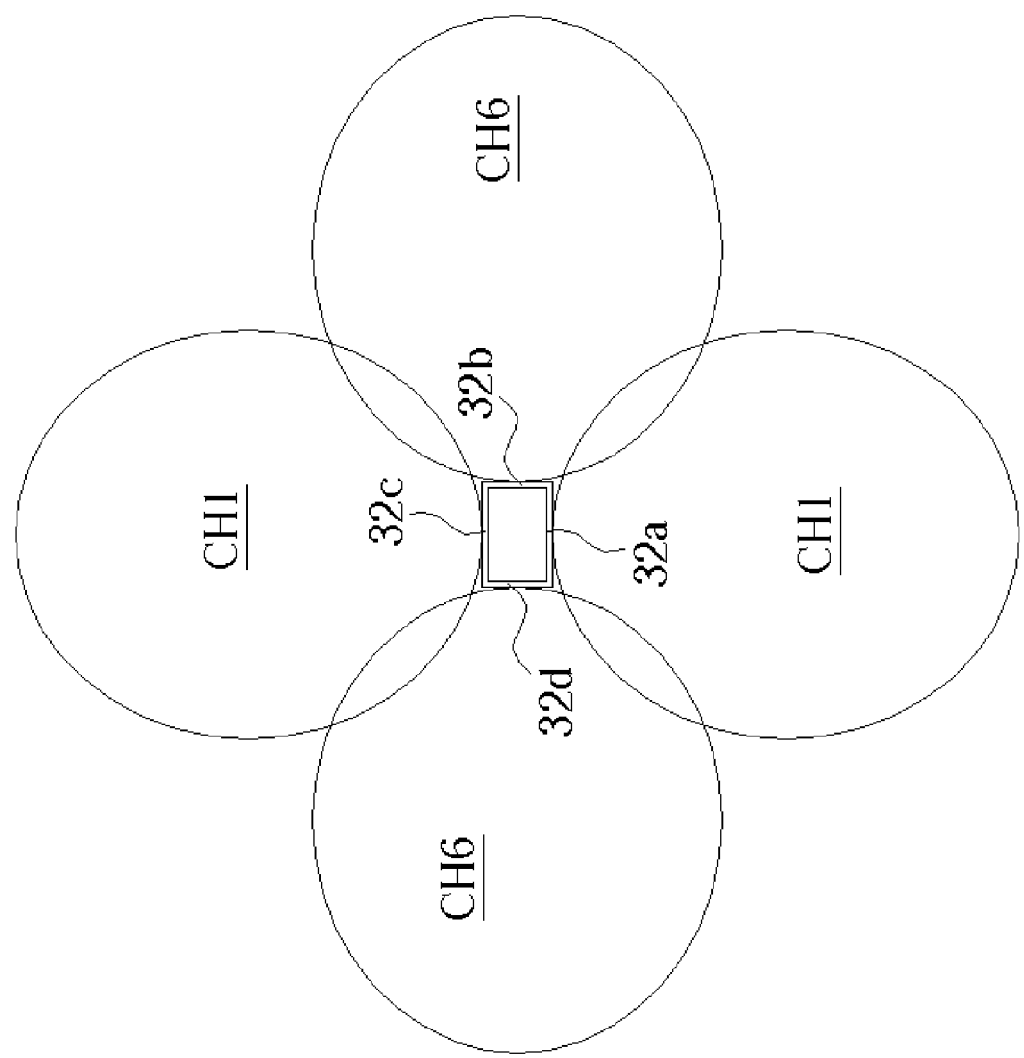
FIG. 10 illustrates the antenna units sharing the channels according to the second embodiment of the present invention.

The antenna module 10 is not limited to include six shielding surfaces. The number of the shielding surfaces and the number of antenna units 16 can be determined according to design requirements. Please refer to FIG. 9 showing an antenna module 30 having a plurality of antenna units according to a second embodiment of the present invention. Different from the antenna module 10, the antenna module 30 is a tetragon having four shielding surfaces 32a-32d made of metal for shielding radio signals, and four antenna units 34a-34d formed on the four shielding surfaces 32a-32d. The antenna units on two neighboring shielding surfaces are perpendicular to each other. That is, the antenna unit 34a on the shielding surface 32a is perpendicular to the antenna unit 34b on the shielding surface 32b, the antenna unit 34b on the shielding surface 32b is perpendicular to the antenna unit 34c on the shielding surface 32c, the antenna unit 34c on the shielding surface 32c is perpendicular to the antenna unit 34d on the shielding surface 32d, and the antenna unit 34d on the shielding surface 32d is perpendicular to the antenna unit 34a on the shielding surface 32a. In such a manner, the polarity directions of the antenna units on two parallel shielding surfaces are perpendicular to each other so that the signal isolation between two antenna units is increased. Therefore, even if two neighboring antenna units use the same channels such as CH1, or two channels close to each other such as CH1 with CH6, the interference between the channels is minimized. Please refer to FIG. 10 showing the antenna units sharing the channels according to the second embodiment of the present invention. As shown in FIG. 10, signal channels used by the antenna units on two parallel shielding surfaces are the same, and signal channels used by the antenna units on two neighboring shielding surfaces are different. That is, the antenna units 32a and 32c use CH1, and the antenna units 32b and 32d use CH11. In such a manner, the antenna units on two neighboring shielding surfaces do not use the same channel or two channels close to each other to prevent interference. Since four antenna units are used for wireless data transmission, the transmission speed is ideally four times that of a single AP. In other words, if the maximum transmission speed of an AP is 111 Mbps, the AP of the antenna module 30 provides a maximum transmission speed of 11*4=44 Mbps.

Figure 11:
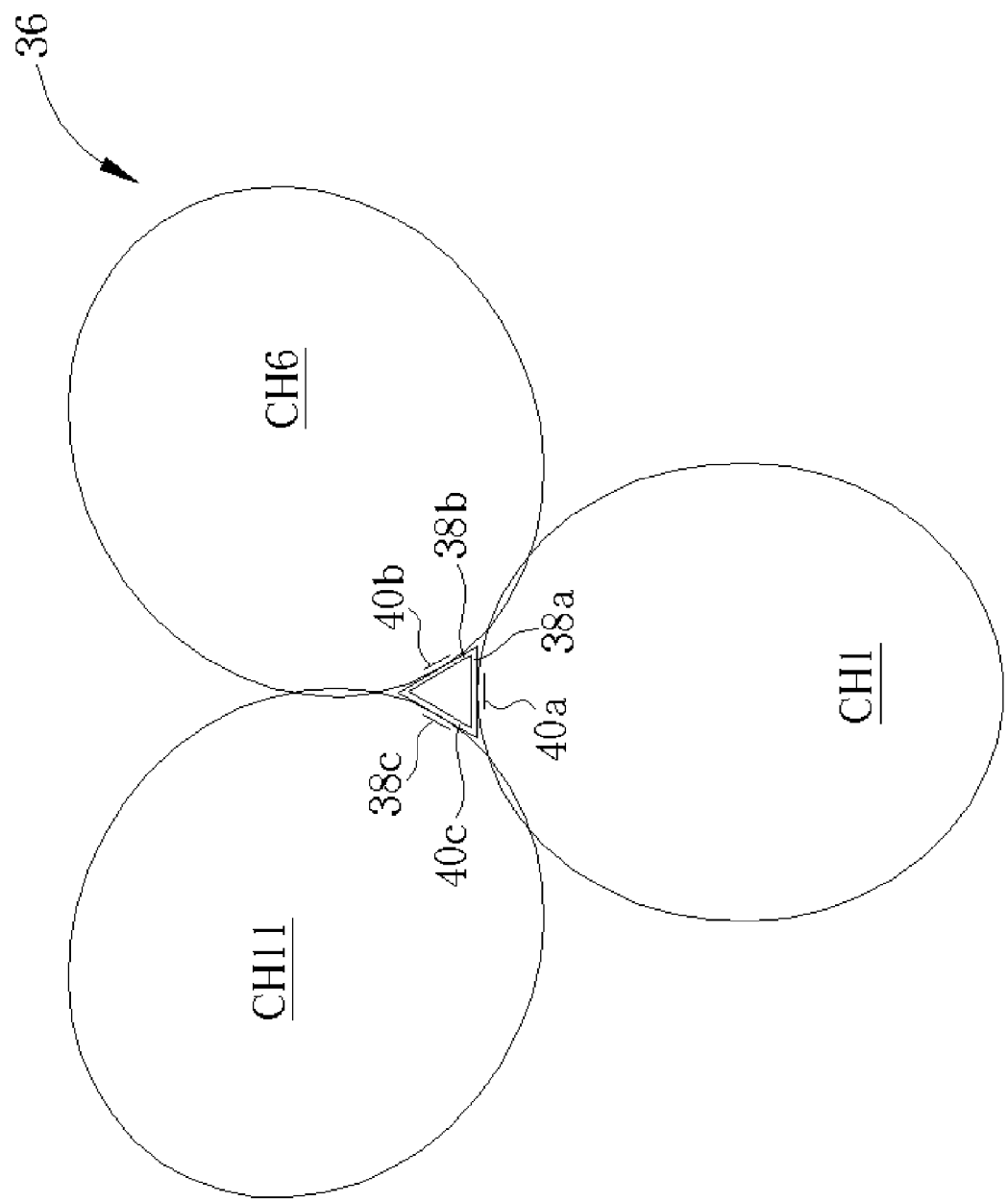
FIG. 11 illustrates an antenna module having a plurality of antenna units according to a third embodiment of the present invention.

Similarly, the antenna module can include three shielding surfaces. Please refer to FIG. 11 showing an antenna module 36 having a plurality of antenna units according to a third embodiment of the present invention. The antenna module 30 is a trigonal figure having three shielding surfaces 38a-38c made of metal for shielding radio signals, and three antenna units 40a-40c formed on the three shielding surfaces 38a-38c. The antenna unit 40a uses CH1, the antenna unit 40b uses CH6, and the antenna unit 40c uses CH11 so that the interference caused by the main lobe overlap can be reduced. Therefore, the AP of the antenna module 36 ideally provides a transmission speed three times that of a single AP.

It is a feature of the present invention to provide the antenna units on two neighboring shielding surfaces of two channels with a larger frequency interval in order to prevent the interference caused by the main lobe overlap between channels. The frequency interval of channels is not limited to 5. For instance, distributing CH1 to one antenna unit and CH7 to its neighboring antenna unit is also possible. As for the antenna units on two parallel shielding surfaces or two shielding surfaces being physically far from each other, they can be perpendicular to each other in order to use the same channel or two close channels, such as CH1 or CH1 for one and CH2 for another.

In the above description, all the shielding surfaces are disposed with antenna units. However, it is also possible to disposed antenna units on only a part of the shielding surfaces according to the present invention. The antenna unit can be composed of a pair of monopolar antennas, another type of antenna, or an array antenna of another number. If the antenna unit has an adjustable radiation pattern, the radiation pattern of the antenna unit can be adjusted according to the status of two neighboring antenna units. For instance, if the data transmission flow of the neighboring shielding surfaces is large, turn on the smaller antenna units so that a less directive radiation pattern can be formed. As such, the receiving range includes that of the neighboring antenna unit to share a part of the signal. And if the data transmission flow of the neighboring shielding surfaces is small, turn on more antenna units so that a strong directive radiation pattern can be formed and the receiving range is focused toward a single direction to provide for the stations in the direction instead of sharing the signal with the neighboring shielding surface.

In contrast to the prior art, the present invention provides an antenna module with a plurality of directive antenna units disposed around the AP in different directions to provide a plurality of channels in a space. In such a manner, the dead angles on the horizontal direction can be reduced, and the interference can be minimized by properly arranging the antenna units so that a single AP can provide a faster transmission speed. Moreover, since each antenna unit has an angle of 45 degrees with the base of the shielding surface on which it is disposed, all of the antenna units can be the same in structure and the antenna units on two parallel shielding surfaces can be perpendicular to each other without adjustment so that the interference caused by radio reflection between two antenna units can be minimized. Such kind of AP can be disposed either vertically or horizontally.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A wireless communication device for transmitting multiple electromagnetic waves within a frequency band wherein the frequency band comprises multiple frequency channels, comprising:
    a shell having a first shielding surface and a second shielding surface for shielding electromagnetic waves, wherein the first shielding surface is substantially parallel to the second shielding surface, and a third shielding surface and a fourth shielding surface;
    a wireless communication module including a first communication unit, a second communication unit, a third communication unit and a fourth communication unit; and
    an antenna module connected to the wireless communication module, the antenna module having a first antenna unit disposed outside the first shielding surface, a second antenna unit disposed outside the second shielding surface, a third antenna unit disposed outside of the third shielding surface and a fourth antenna unit disposed outside of the fourth shielding surface;
    wherein the first antenna unit connects to the first communication unit for transmitting a first electromagnetic wave, the second antenna unit connects to the second antenna unit for transmitting a second electromagnetic wave, the polarity direction of the first electromagnetic wave and the polarity direction of the second electromagnetic wave are substantially perpendicular, the first electromagnetic wave and the second electromagnetic wave are of the same frequency channel, the third shielding surface is substantially parallel to the fourth shielding surface, the third antenna unit connects to the third communication unit for transmitting a third electromagnetic wave and the fourth antenna unit connects to the fourth antenna unit for transmitting a fourth electromagnetic wave, and the polarity direction of the third electromagnetic wave and the polarity direction of the fourth electromagnetic wave are substantially perpendicular.

2. The wireless communication device of claim 1, wherein the structures of the third and the fourth antenna units are substantially identical, and wherein the third antenna unit is substantially perpendicular to the fourth antenna unit.

3. The wireless communication device of claim 1, wherein the first, second, third and fourth shielding surface form a tetragon al cylinder.

4. The wireless communication device of claim 1,
wherein the third electromagnetic wave and the fourth electromagnetic wave are of the same frequency channel.

5. The wireless communication device of claim 4,
wherein the shell further comprises a fifth shielding surface and a sixth shielding surface, the wireless communication module further comprises a fifth communication unit and a sixth communication unit, and the antenna module further comprises a fifth antenna unit disposed outside of the fifth shielding surface and a sixth antenna unit disposed outside of the sixth shielding surface;
wherein the fifth shielding surface is substantially parallel to the sixth shielding surface, the fifth antenna unit connects to the fifth communication unit for transmitting a fifth electromagnetic wave and the sixth antenna unit connects to the sixth antenna unit for transmitting a sixth electromagnetic wave, and the polarity direction of the fifth electromagnetic wave and the polarity direction of the sixth electromagnetic wave are substantially perpendicular.

6. The wireless communication device of claim 5,
wherein the fifth electromagnetic wave and the sixth electromagnetic wave are of the same frequency channel.

7. The wireless communication device of claim 6,
wherein the first and the second electromagnetic waves belongs to a first frequency channel, the third and the fourth electromagnetic waves belongs to a third frequency channel, and the fifth and the sixth electromagnetic waves belongs to a fifth frequency channel.

8. The wireless communication device of claim 7,
wherein the first frequency channel is about 2.412 GHz, the third frequency channel is about 2.437 GHz, and the fifth frequency channel is about 2.463 GHz.

9. The wireless communication device of claim 5,
wherein the first, second, third and fourth shielding surface form a tetragonal cylinder.

10. The wireless communication device of claim 5,
wherein the structures of the fifth and the sixth antenna units are substantially identical, and the fifth antenna unit is substantially perpendicular to the sixth antenna unit.

* * * * *